Inventor:
John W. Jacobson,
by Richard E. Horley
His Attorney.

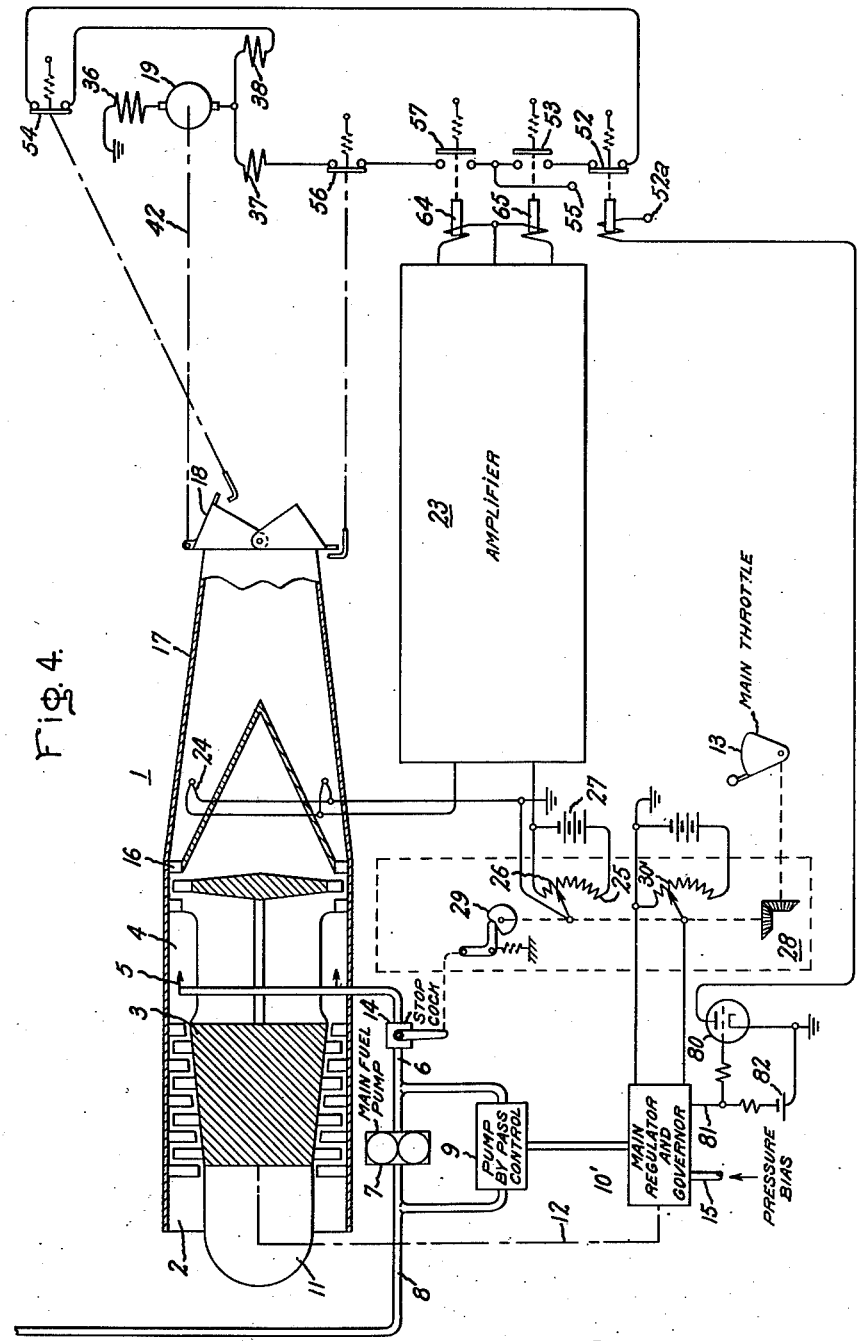

United States Patent Office 2,815,644
Patented Dec. 10, 1957

2,815,644

CONTROL SYSTEM FOR GAS TURBINE POWER-PLANT INCLUDING TEMPERATURE SCHEDULING CONTROL

John W. Jacobson, Schenectady, N. Y., assignor to General Electric Company, a corporation of New York Application March 16, 1953, Serial No. 342,546

18 Claims. (Cl. 60—35.6)

This is a continuation-in-part of patent application Serial No. 213,536, filed March 2, 1951, now abandoned. This invention relates to control systems for gas turbine power plants and, more particularly, to a control system for an aircraft gas turbine power plant and has for an object the provision of an improved control system to operate a power plant of this character at substantially the minimum rate of fuel consumption.

A gas turbine power plant for the propulsion of aircraft may include an air compressor to increase the pressure of incoming air, combustion apparatus for burning fuel in the compressed air, and a gas turbine in series flow relation with the compression and combustion apparatus through which the heated high pressure gas there generated is expanded. The turbine extracts power from the gas to drive the compressor. Thurst is produced by expanding the turbine exhaust gases through a suitable jet nozzle. Aircraft gas turbine power plants of this type are more particularly described in Patent 2,432,-359 to Dale D. Streid, and an application Serial No. 541,565, now Patent No. 2,711,074 filed June 22, 1944, of Alan Howard, both assigned to the assignee of the present application.

In gas turbine power plant controls, particularly for high performance aircraft power plants having variable discharge jet nozzle area, jet nozzle area and engine speed are advantageously scheduled with relation to throttle position for operation of power plants not equipped for reheat fuel burning for augmentation of thrust or with reheat turned off. A control system of this kind is described and forms a portion of the subject matter claimed in my co-pending patent application Serial No. 133,066, filed December 15, 1949, now Patent Number 2, 706, 383, and assigned to the same assignee as the present application. The present invention constitutes an improvement over the invention disclosed in that prior application. The total available pressure drop in such a power plant occurs through the gas turbine and through the jet nozzle. The jet nozzle is scheduled to an open position during engine starting and during low speed operation to increase the proportion of the total available drop in gas pressure available for the gas turbine by decreasing the proportion through the jet nozzle. The higher turbine pressure drop thus obtained permits fast acceleration at low engine speeds and also provides steady state operation at relatively high speeds with low thrust under conditions of low fuel flow and low exhaust gas temperature. High engine speed also permits rapid increase from intermediate to maximum thrust by decrease of nozzle area with less delay for engine acceleration.

Under these conditions, as the throttle is advanced from the off position to increase engine speed, the nozzle remains open until the speed approaches its maximum value, when the jet nozzle is scheduled gradually to close. This low thrust, engine speed increasing range of operation may be referred to as the acceleration range.

Final movement of the throttle produces a substantially constant full engine speed during which nozzle area is gradually scheduled to the fully closed position. This second range of operation may be referred to as the cruising range.

The schedules of engine speed and jet nozzle area with respect to throttle position are determined by the desired relation between throttle position and thrust. This relation varies considerably with changes in engine operation conditions such as altitude, air speed and compressor inlet temperature, resulting in a departure from the desired relation of thrust versus throttle position. Also these variations in operating conditions cause increases in specific fuel consumption, particularly in the cruse thrust range of settings.

Accordingly, it is one important object of the present invention to provide an improved control system for a gas turbine reaction power plant in which a given control throttle setting results in maintenance of a substantially constant proportion of the maximum available thrust over wide variations in operating conditions.

Another important object of this invention is to provide an improved control system for a gas turbine reaction power plant having a variable area discharge nozzle in which maximum fuel economic are obtained over the entire crusing range of selected engine thrusts under widely varying engine operating conditions.

A further object of the present invention is to provide an improved control system and an improved mode of control system operation in which a simple control of only a few engine parameters provides maximum fuel economy over a wide range of thrusts under widely varying conditions of operation with substantial maintenance of correlated values of thrust versus control throttle position.

One of the principal problems in the control and operation of an aircraft gas turbine reaction power plant is in obtaining maximum efficiency and maximum power output by maintenance of maximum engine turbine speed and maximum temperatures without causing destruction of the combustion gas turbine.

Accordingly, it is a further object of the present invention to provide a control system for a gas turbine reaction power plant in which the maximum thermal strength reduction produced by the highest temperatures may be arranged not to coincide with the occurrence of maximum mechanical stresses obtained at the maximum turbine speed.

In carrying out the above objects of this invention, a new mode of operation and a new control system may be employed in which a throttle or power level selection device may be employed which concurrently selects correlated values of engine speed and maximum engine temperature to be maintained. A speed governor is included to maintain the speeds selected by control of engine fuel input. A temperature regulator is also included for maintaining the selected maximum temperatures by adjustment of the variable engine discharge nozzle area. The correlated values of speed and temperature are chosen for maximum fuel ecenomy at each power level setting according to the characteristics of the engine to be controlled.

For a better understanding of this invention, reference should be made to the following specification and the accompanying drawings in which:

Fig. 4 is a schematic diagram of an alternative embodiment of the control system of this invention;

Figure 1:
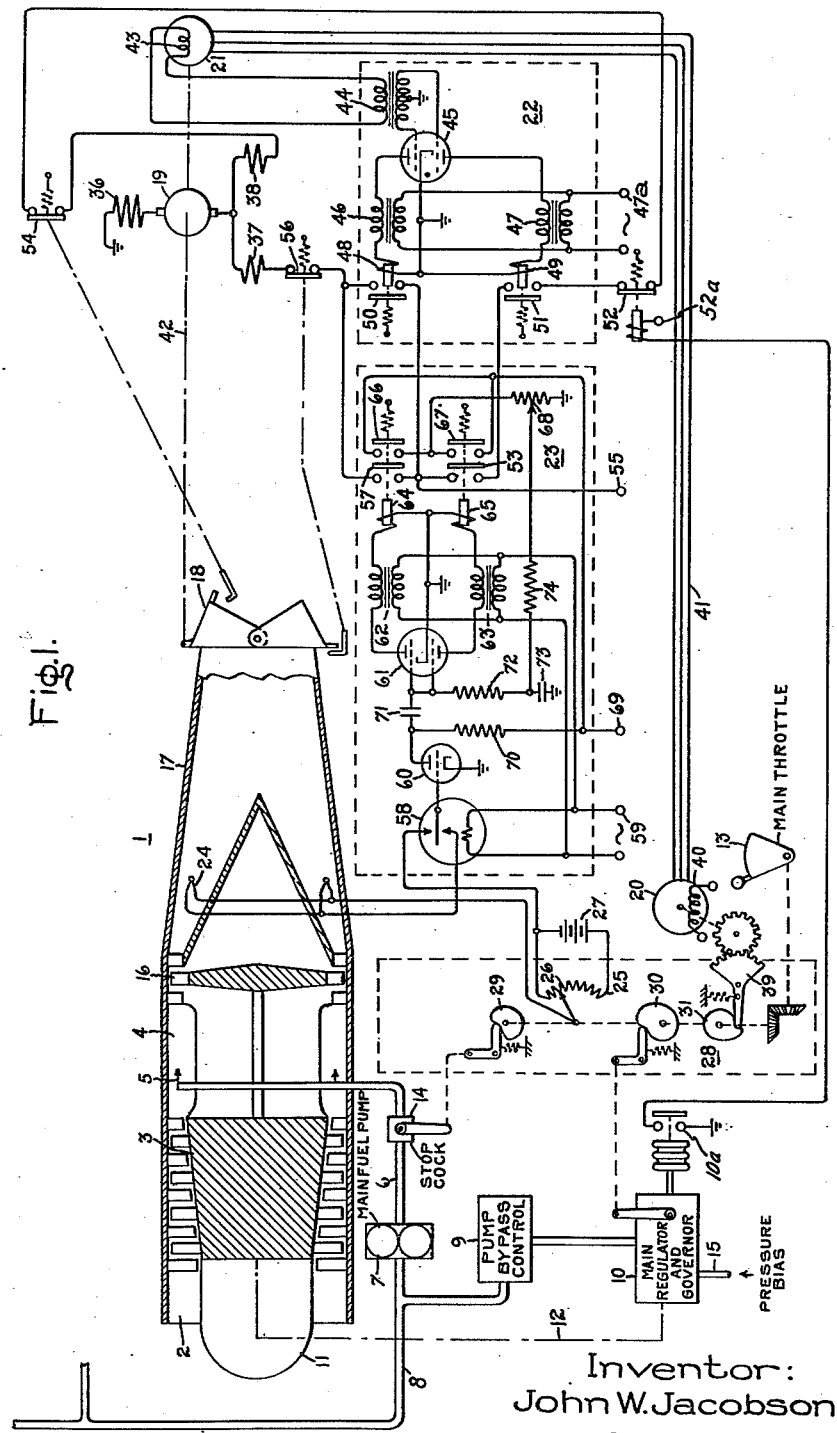
Fig. 1 is a schematic diagram of a preferred embodiment of the control system of this invention.

Referring particularly to Fig. 1, an aircraft gas turbine is generally identified as 1. Air is drawn in an inlet 2 and is compressed by a compressor 3. The fuel supply of the turbine is introduced into combustion chamber 4 by suitable nozzles 5 which are connected in parallel flow relation to a common fuel manifold 6. Fuel is conveyed to nozzles 5 by a suitable pump 7 from a fuel supply (not shown) through a fuel supply line 8. The output of pump 7 is modulated by a pump bypass control 9 which is controlled by a speed regulator 10 to be hereinafter more fully described. The speed regulator 10 is connected to a gear case 11 of turbine 1 by a shaft shown schematically at 12 to provide an indication of turbine speed. The control shaft of regulator 10 is linked in any suitable manner to a main throttle 13, which is also linked to a shut-off valve 14 in manifold 6. Throttle 13 may be referred to below as a thrust selector or power output level selector.

In gas turbine power plants intended for use at sea level or at substantially constant altitude, it is a relatively simple matter to supply the fuel requirements of the engine. However, in aircraft service where the engine is required to operate over a wide range of altitude and where the fuel requirements vary as a function of the altitude, it is desirable to provide compensation to limit the fuel supply to the engine in accordance with a preselected function of the atmospheric or other pressure. Thus, the regulator 10 may be provided with an atmospheric or compressor pressure bias as shown at 15.

Fuel is burned in combustion chamber 4 and the gases produced therein are expanded through a turbine 16 which drives compressor 3. The hot gases from turbine 16 are discharged through a tail pipe 17 and a jet nozzle 18 at the end thereof to provide thrust for propelling the aircraft.

Jet nozzle 18 is of the variable area type and is actuated by a suitable actuator mechanism including a nozzle actuator motor 19, a selsyn transmitter 20 electrically connected to a selsyn receiver 21, and a nozzle position amplifier unit generally identified as 22, to be hereinafter more fully described. The system including selsyns 20 and 21 and amplifier 22 may be collectively referred to below as a nozzle area regulator. Operation of jet nozzle actuator motor 19 is also affected by a temperature control amplifier generally identified as 23, operating in accordance with signals derived from thermocouples 24 positioned in tail pipe 17, intermediate turbine 16 and jet nozzle 18 in the path of the gases discharged from turbine 16, and a temperature reference voltage source 25 including a non-linear potentiometer 26 shunt connected to a battery 27. Amplifier 23, thermocouples 24 and voltage source 25 may be collectively referred to below as a temperature regulator.

In order to provide for operation of the fuel regulator 10, shut-off valve 14, variable area jet nozzle 18 and temperature reference unit 25, an arrangement now to be described is provided. Manual operation of power plant 1 is provided through throttle 13 which is connected through a shaft to a scheduling unit generally identified as 28. Scheduling unit 28 includes a plurality of cams mounted upon the shaft and schedules fuel supply, jet nozzle area and exhaust gas reference temperature with relation to throttle position to produce a predetermined relationship between throttle position and thrust. Thus, cams 29 and 30, respectively, are operatively connected to main fuel shut-off valve 14 and main fuel regulator 10 and cam 31 operates selsyn transmitter 20 to actuate variable area jet nozzle 18 through selsyn receiver 21, amplifier 22 and motor 19. The shaft in scheduling unit 28 operates potentiometer unit 26 in temperature reference unit 25 to vary the exhaust gas temperature reference for control of jet nozzle 18.

Figure 2:
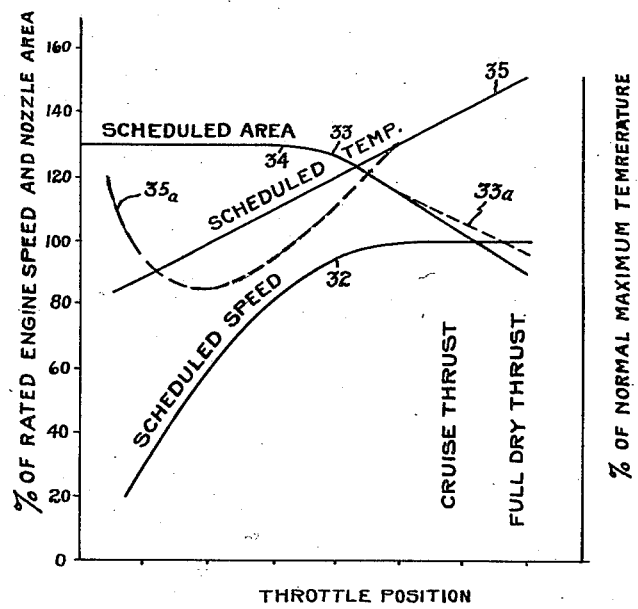
Fig. 2 is a graph of typical engine control characteristics obtainable with the system of Fig. 1.

The scheduled relation between pilot's throttle position and engine speed, jet nozzle area and exhaust gas temperature is shown in Fig. 2. The percentages of rated speed and rated nozzle area and the percentages of normal exhaust temperature are plotted against throttle positions. In operation, initial motion of throttle 13 from the off position causes cam 29 to open main fuel shut-off valve 14. Continued motion of throttle 13 causes main fuel regulator 10 to be actuated by cam 30 to regulate the flow of fuel to the engine for operation at speeds shown by curve 32 in Fig. 2. Curve 33 of Fig. 2 shows the scheduled opening of nozzle 18 according to cam 31. In the low speed or acceleration region of throttle 13, nozzle cam 31 has a dwell portion to hold the jet nozzle in the open position shown by the portion of curve 33 between 0 and point 34 in Fig. 2. The exhaust gas temperature reference is scheduled according to curve 35 in Fig. 2.

When throttle 13 has been moved to a position approaching 100% engine speed, a dwell on fuel regulator cam 30 prevent further substantial increase of engine speed. At full throttle position, in which 100% engine speed, fully closed jet nozzle and maximum steady-state operating temperature are scheduled, the engine operates at full speed and at scheduled maximum steady-state exhaust temperature. To maintain a temperature no higher than the maximum scheduled temperature, the jet nozzle may be driven partially open from the setting scheduled by the nozzle area curve 33. It will be obvious that the speed and fuel regulator cam 30 may be sloped to provide a slight variation in engine speed for changes in thrust required by movement of throttle 13 in the crusing range rather than holding a constant 100% speed value. Such a changing speed characteristic should be properly correlated with the scheduled temperature characteristic 35 provided by the potentiometer 26 of temperature reference voltage source 25. These correlated schedules should be tailored to the characteristics of the engine which is to be controlled in order to obtain minimum fuel consumption or maximum fuel economy.

In an aircraft gas turbine of the type shown in Fig. 1, the energy required to drive compressor 3 is provided by turbine 16, which energy comes from the expansion of the hot gases discharged from the combustion chamber 4 through the turbine wheel. The energy absorbed by the turbine wheel is dependent upon the mass of gas flowing, the temperature of the incoming gas and the pressure drop through the turbine wheel.

The engine is in a state of equilibrium when the energy required to drive the compressor is exactly equal to the energy absorbed by the turbine wheel. After progressing through the turbine wheel, the hot gases are further expanded to atmospheric condition through the jet nozzle to produce engine thrust. It can be seen that the energy produced in the engine is expended in the turbine wheel and in the jet nozzle. At this condition of equilibrium, the air flow through the engine is substantially constant.

The temperature of the gases resulting from conbustion within the engine, which is measured by thermocouples 24, is substantially proportional to the fuel to air ratio and the mass of air flowing through a compressor of this type is substantially proportional to the compressor speed and is substantially independent of the discharged pressure for a fixed inlet pressure and temperature. The equilibrium of the engine can be disturbed by changing the area of the variable area jet nozzle. Assume that jet nozzle 18 is moved a given amount by motor 19 to decrease the effective area of the nozzle through which the hot exhaust gases are being discharged, causing a momentary increase in the pressure of the gas in tail pipe 17 and consequently decreasing the pressure drop across turbine 16. Gas continues to flow at the same rate through jet nozzle 18, resulting in a decrease in the pressure drop across the turbine wheel 16 and a reduction in the energy input to the turbine.

The energy required to drive the compressor remains essentially the same but the equilibrium of the machine has been disturbed and the rotating member including compressor 3 and turbine 16 decelerates. Regulator 10, responsive to this deceleration, causes pump by-pass control 9 to reduce the fuel by-passed thereby, to increase the flow of fuel from pump 7 to combustion chamber 4 through nozzle 5 thereby restoring equilibrium of the engine at the same engine speed but with the jet nozzle 18 in a position of reduced area and with increased fuel flow to the engine. Since the air flow has remained substantially the same as before, the resultant fuel to air ratio has increased with a corresponding increase in exhaust gas temperature.

From this explanation, it can be seen that for a given engine speed, the exhaust gas temperature can be increased indirectly by decreasing the jet nozzle area. Conversely, the exhaust gas temperature can be decreased by increasing the area of the jet nozzle.

To reduce the temperature of the gases discharged from turbine 16, which has become excessive for any reason, the arrangement now to be described is provided. Actuator 19 is a series motor having a series clutch-brake coil 36 and provided with a pair of series field windings 37 and 38 for opposite directions of rotation. Motor 19 is controlled by main throttle 13 by means of the servo-mechanism including selsyn transmitter 20 and selsyn receiver 21.

The connection between throttle 13 and cam 31 is mentioned above. A follower mechanism 39 in engagement with cam 31 drives selsyn transmitter 20 which is provided with a single phase winding 40 excited by a source of alternating current (not shown) and a three phase winding connection by lines 41 to selsyn receiver 21. Selsyn 21 is arranged on the drive shaft 42 of jet nozzle actuator motor 19 and its single phase winding 43 excites jet nozzle position amplifier 22 to energize jet nozzle actuator motor 19.

Amplifier 22 includes a transformer 44 having a primary winding series connected to winding 43 and a secondary winding connected in series with a pair of grids of a suitable power tube 45. Tube 45 is provided with plates which are arranged in series with the secondaries of a pair of transformers 46 and 47, and the operating coils of a pair of relays 48 and 49. The primaries of transformers 46 and 47 are respectively connected across a suitable source of alternating current 47a. Relays 48 and 49 respectively actuate "open" contacts 50 which are normally open and "close" contacts 51 which also are normally open.

Normally closed acceleration contacts 52 and normally open temperature control contacts 53 of control amplifier 23, both to be hereinafter described, are arranged in series with contacts 51. Nozzle 18 is provided with a closed limit switch having normally closed contacts 54. Temperature control contacts 53, "close" position contacts 51, acceleration contacts 52 and limit switch contacts 54 are arranged in series between an actuator motor power source 55 and close field winding 38 for energization of motor 19.

Normally closed limit switch contacts 56 are arranged to open responsive to the maximum open position of nozzle 18 and are connected in series with open field winding 37 of motor 19, "open" position contacts 57 of amplifier 23 and motor power source 55. Contacts 57 are also arranged in parallel connection with "open" contacts 50 of position amplifier 22.

When the engine is started, assuming that nozzle 18 is not already at its maximum open position, "open" limit switch contacts 56 are closed and the open position of nozzle 18 is scheduled. A signal from selsyn receiver 21 responsive to the position of nozzle 18 closes "open" contacts 50 of position amplifier 22, energizing open field winding 37 of actuator motor 19 to drive nozzle 18 to its open position.

Upon starting, maximum close limit switch contacts 54 of nozzle 18 are also closed. It may be assumed that acceleration contacts 52 are closed as will be hereinafter described and "close" contacts 53 of amplifier 23 are also closed. As throttle 13 is advanced, a reduction in the area of nozzle 18 is ultimately scheduled by cam 31, resulting in energization of the coil of close relay 49 by selsyn receiver 21, closing contacts 51 to energize close field winding 38. Motor 19 then drives nozzles 18 in the close direction until the reduced area scheduled by cam 31 is reached, at which point "close" contacts 51 open. The above-described operation produces the area schedule shown in Fig. 2 wherein nozzle 18 is at the open position at the starting of the engine and at low engine speed and gradually closes as the throttle advances. Engine speed increases with the simultaneous increase in turbine discharge temperature.

A temperature regulator for operating motor 19 to trim nozzle 18 in response to excessive turbine discharge temperatures includes low time constant temperature sensing units, such as thermocouples 24, reference voltage source 25 and temperature control amplifier 23 as mentioned above.

Reference voltage source 25 is provided with a brush which moves across variable resistor 26 responsive to movement of throttle 13 to produce voltages substantially corresponding to empirically determined optimum temperature values of exhaust gases at each position of throttle 13 for minimum specific fuel consumption. These values are plotted in curve 35 of Fig. 2. Thermocouples 24 and reference source 25 are connected in series between the grids of a converter 58 of amplifier 23. Thus direct current voltage signals from thermocouples 24 are compared with the voltage of reference source 25 and the difference, which may be referred to as an eror voltage, resulting from this comparison is converted into D.-C. pulses by converter 58. The converter may be a simple vibrator unit operated from a source of alternating current 59 to change a plus direct current error signal resulting from a discharge temperature higher than the corresponding scheduled empirical value into a series of plus voltage pulses of the same frequency as the source 59 and to change a minus error signal from a discharge temperature lower than the corresponding scheduled value to a series of minus pulses 180° apart in phase from the plus signals.

The pulses are impressed upon the grid of a voltage amplifier tube 60 and the amplified positive and negative signals are conducted to the grids of a dual tube 61. The plates of tube 61 corresponding to the positive and negative signals are respectively arranged in series with the secondaries of transformers 62 and 63, and the coils of a pair of relays 64 and 65 which operate contacts 57 and 53, respectively. The primaries of transformers 62 and 63 are energized by A.-C. source 59. Tube 61 and transformers 62 and 63 form a phase discriminator. A stabilizing network between contacts 57 and 53 and the phase discriminator comprises contacts 66 and 67 respectively operated by relays 64 and 65, a variable stabilizing resistor 68 through which contacts 66 and 67 are commonly grounded, a source of amplifier power 69 connected through a resistor 70 and a capacitor 71 to the grids of tube 61, a resistor 72 and a capacitor 73 connected between the grids of tube 61 and ground and a resistor 74 connected at a point between resistor 72 and capacitor 73 and to the brush of variable resistor 68. This stabilizing network is disclosed in a more elaborate form and comprises a portion of the subject matter claimed in co-pending patent application Ser. No. 102,228, filed June 30, 1949, now Patent Number 2,699,524, by Ernest J. Jackson and Allan J. Gardiner and assigned to the same assignee as the present application.

The actuating winding of acceleration relay 52 is connected in series with contacts 10a of main regulator and governor 10 to be supplied from a voltage source connected at terminal 52a. Contacts 10a are adapted to be closed by regulator 10 responsive to operation thereof calling for greater fuel flow for acceleration to the speed called for by the setting of throttle 13, temporarily disconnecting and disabling the nozzle closing circuit including motor winding 38 during any period of turbine acceleration. This acceleration disablement feature including relay 52 and contacts 10a of regulator 10 constitutes a portion of the subject matter described and claimed in my above-mentioned co-pending patent application, Ser. No. 133,066, filed December 15, 1949, now Patent Number 2,706,383.

Motor 19 operates in the close direction only when contacts 53 are closed responsive to a negative signal indicating that the exhaust temperature is below the corresponding predetermined value, acceleration contacts 52 are closed responsive to a non-acceleration condition and contacts 51 are closed responsive to the position of nozzle area scheduling cam 31.

In the reduced jet nozzle area range of positions of throttle 13, cam 31 is constructed to schedule nozzle area to lower values than those corresponding to the empirical values of exhaust temperature determined by reference voltage source 25 to allow trimming control to increase the area of nozzle 18 to limit the actual exhaust temperatures.

Contacts 57 are disposed in parallel relation to contacts 50 so that when contacts 57 close responsive to actual exhaust temperatures in excess of the corresponding scheduled empirical values of exhaust temperature, a circuit is completed between voltage source 55 and open field 37 to operate motor 19 in the open direction to thus open the nozzle until the exhaust temperature is reduced to the value required for minimum specific fuel consumption at which time the positive signal is wiped out.

The values of capacitor 73 and of resistors 68 and 74 are proportioned so that the time constant of this RC circuit approximates the combined time constant of the engine and control system including the gas turbine, the regulator 10 and the fuel system, the thermocouples, and the rate of tail pipe pressure change which is produced by the nozzle control system. These time constants are dependent upon the prevailing flight conditions including altitude, air speeds and so forth. Potentiometer 68 is so adjusted that a feed-back voltage of the proper value is applied to the grids of tube 61 to oppose the error signals impressed thereon in order to obtain the correct wash-out time in accordance with the time constants enumerated above.

When relay 64 is picked up responsive to a plus error signal, contacts 66 close, placing a predetermined voltage across capacitor 73 determined by the setting of potentiometer 68 which tends to oppose the error signal. A similar action takes place when contacts 67 close responsive to a minus error signal. Potentiometer 68 may be connected to a device (not shown) responsive to an appropriate pressure such as compressor inlet pressure to secure a stabilizing signal responsive to flight condition.

A dotted curve 35a of Fig. 2 indicates the unscheduled discharge temperature of the engine. From the curve, the temperature is at a maximum immediately after opening throttle 13 which cannot be reduced by the apparatus herein described since nozzle 18 is already at its full open position. Temperature decreases sharply to a minimum as throttle 13 is advanced from the closed position and increases again at a slower rate to the predetermined temperature for maximum throttle position.

One advantage of my invention becomes evident when deterioration of parts of the power plant in service such as corrosion of air inlet 2 for instance reduces the air intake of the engine, causing the discharge temperature to rise. With the device herein described, the exhaust gas temperatures can be limited to the schedule of optimum values to minimize the effects of such deterioration even though different discharge areas may be called for.

Figure 3:
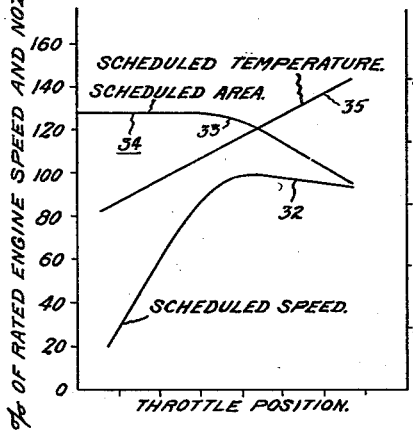
Fig. 3 is a graph of alternative engine control characteristics obtainable with the system of Fig. 1 in which the controlled engine speed decreases slightly as power increases in the uppermost power range.

As mentioned above, the scheduled values of temperature as shown by curve 35 of Fig. 2 and speed as shown by curve 32 of Fig. 2 are preferably correlated so as to provide for minimum specific fuel consumption or maximum fuel efficiency for the engine being controlled. The scheduled characteristics of these curves will vary, depending upon the operating characteristics of the engine to be controlled. For some engine designs, it is probable that the speed curve in the cruising range may preferably have a slight negative slope, calling for slightly decreasing speeds as thrust is increased in the crusing range. Such a characteristic is shown by curve 32 in Fig. 3. The other curves of␣Fig. 3 are the same as those of Fig. 2.

An advantage of the negative slope speed schedule characteristic, apart from maximum fuel efficiency, is that as the strength of the turbine wheel is decreasing due to increased scheduled maximum operating temperatures as the thrust is increased, the mechanical stresses on the turbine wheel will concurrently decrease and these two factors will compensate for one another. Employment of such engine control characteristics may therefore permit higher turbine speeds than have hitherto been permitted at the lower cruising thrusts with a resulting increase in fuel efficiency and cruising range.

Fig. 4 is a schematic diagram of an alternative embodiment of the control system of the present invention in which the nozzle area regulator has been eliminated and the function of the nozzle area regulator, that is, keeping the nozzle area large by keeping the variable discharge nozzle open during the acceleration range of operation, is provided by the temperature regulator. This result is obtained by scheduling the maximum temperature at a very low value, below the normal temperatures in the acceleration range of throttle positions as plotted by curve 35′ of Fig. 5. The temperature regulator therefore causes the variable area nozzle to open wide in an attempt to reduce the temperature to the scheduled value until acceleration into the cruising range.

Figure 5:
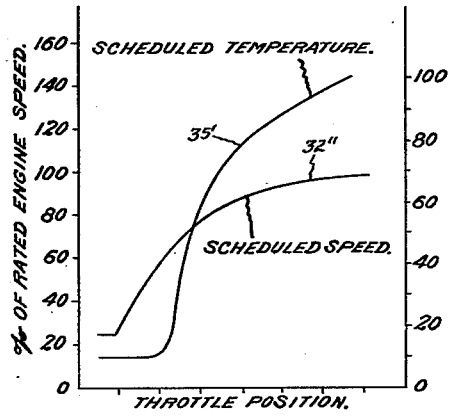
Fig. 5 is a graph of engine control characteristics obtainable with the embodiment of Fig. 4.

Fig. 5 shows typical characteristic curves which might be obtained with the system of Fig. 4 in which a speed schedule curve 32″ having a continuously increasing speed characteristic, even in the cruising range, is provided. These curves are chosen, of course, to obtain maximum fuel efficiency over the entire cruising range.

In Fig. 4, the amplifier 23 may be identical to that shown in Fig. 1. An electrical speed governor 10′ may be alternatively employed in either the system of Fig. 1 or Fig. 4 as shown in Fig. 4, in which an electrical speed setting may be provided from a potentiometer 30′ which is adjusted by throttle 13 to select the scheduled speed value in terms of a direct current voltage. The non-linear speed characteristic shown by curve 32″ of Fig. 5 may be obtained by employment of a potentiometer 30′ having a suitable non-linear resistance characteristic. The electrical speed governor 10′ which is employed in this embodiment may preferably be of the type which is disclosed in detail for instance in patent application Serial No. 264,178, filed December 29, 1951, by Bruce A. Wells and Clinton C. Lawry for An Electrical Speed Control System for Engines, and assigned to the same assignee as the present application.

Acceleration relay 52 is energized from an electron discharge device 80 which is connected to become conductive in response to an error signal from regulator 10' at connection 81 indicating a required speed higher than the speed achieved (an acceleration condition). When the acceleration signal at connection 81 is high enough to overcome the permanent bias on the grid of device 80 supplied by a grid biased battery 82, device 80 becomes conductive, picking up acceleration relay 52 to prevent closure of the variable area discharge nozzle 18 as described above. The acceleration relay energization circuit including device 80 is similar to that which forms a portion of the subject matter described and claimed in patent application Serial No. 269,214, filed January 31, 1952, by Clinton C. Lawry and Bruce A. Wells for An Engine Acceleration Control System, and assigned to the same assignee as the present application. All of the features of Fig. 4 other than those mentioned above are substantially identical to those of the system of Fig. 1.

Figure 6:
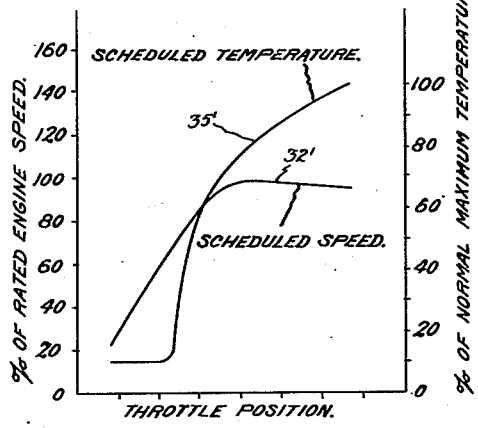
Fig. 6 is a graph of alternative engine characteristics corresponding to Fig. 3, but obtainable with the system of Fig. 4.

As mentioned above in connection with Fig. 3, although some engine designs may require speed curves having a continuing positive slope, some may require a slight negative slope for advancing thrusts in the cruising range. Characteristics which may be provided for such an engine by the control system of Fig. 4 are shown in Fig. 6 by curves 35' and 32'.

The following claims are intended to define the valid scope of this invention over the prior art and to cover all changes and modifications falling within the true spirit and valid scope of the invention.

What I claim as new and desire to secure by Letters Patent of the United States is:

1. A control system for an aircraft gas turbine having an adjustable area discharge nozzle comprising a power level selection device including means for selecting scheduled correlated values of turbine speed and temperature matched to the maximum fuel economy for the engine to be controlled for the entire cruising range of power levels, a speed regulator connected to said selection device for controlling the power plant fuel to maintain the selected speed, a nozzle area regulator connected to said selection device and operative in the acceleration range for predetermined control of the area of the discharge nozzle, and a nozzle area varying temperature regulator connected to said selection device for maintaining selected temperatures by variation of the discharge nozzle area.

2. A control system for providing the most economical use of fuel to obtain the greatest thermal efficiency under varying conditions of operation of a thermal power plant having a variable discharge area comprising a power plant speed regulator for controlling fuel input to thereby control speed, an engine temperature regulator including means responsive to the temperature of said power plant for controlling the variable discharge area thereof, a discharge area regulator for selectively controlling the discharge area, and apparatus connected to said discharge area regulator and to both said speed and temperature regulators for changing the settings of the desired speed and temperature according to a predetermined correlated schedule upon a change in power output required of said power plant.

3. A control system for a fuel burning aircraft gas turbine having a variable area discharge nozzle and comprising an adjustable power output level setting apparatus for concurrently selecting correlated values of desired engine speed and maximum engine temperature, the characteristic of at least one of said values as set by said apparatus corresponding to a non-linear function of the movement thereof, a fuel regulator including turbine speed measuring apparatus connected to said power setting apparatus for maintenance of the speed selected thereby, a temperature regulator connected to said power setting apparatus including devices for measuring turbine temperature and arranged to compare the measured temperature with the selected temperature to obtain a temperature change signal, a motor connected for energization by said temperature change signal for positioning the variable area discharge nozzle, and a discharge nozzle regulator coupled to said motor for selective operation of said area discharge nozzle.

4. A control system for a fuel burning aircraft gas turbine having a variable area discharge nozzle comprising an adjustable power output selector for maintaining selective discharge nozzle area and for concurrently selecting correlated increasing values of engine speed and engine temperature for increasing power levels, the characteristic of at least one of said selected values corresponding to a non-linear function of the movement of said selector, a fuel regulator including turbine speed measuring apparatus connected to said selector for maintenance of the speed selected thereby, a temperature regulator connected to said selector including devices for measuring turbine temperature and arranged to compare the measured temperature with the selected temperature to obtain a temperature change signal, and a motor connected for energization by said power output selector for positioning the variable area discharge nozzle to selectively maintain predetermined discharge nozzle area and selected temperature.

5. A control system for an aircraft gas turbine reaction power plant having a variable area discharge nozzle comprising a fuel system for supplying fuel to the power plant including a valve for controlling the rate at which the fuel is supplied, a regulator connected to control said valve including a connection for detection of turbine speed for the regulation of selected speeds by control of fuel; a positioning motor for varying the power plant discharge nozzle area, temperature regulating apparatus connected for energizing said motor for changing the position thereof including devices for detecting a power plant temperature for maintenance of a selected temperature by variation of the discharge area; a device connected to both of said regulators for concurrently setting correlated values of speed and temperature in accordance with desired power output levels, and a device connected between said speed regulator and said positioning motor actuable in response to an acceleration condition of said speed regulator indicating a required speed higher than the speed achieved for disconnecting said positioning motor to prevent discharge area reducing energization thereof.

6. A control system for an aircraft gas turbine reaction power plant having a variable area discharge nozzle comprising means for maintaining selected turbine speeds by control of fuel input, means for maintaining the discharge nozzle in an open position for the acceleration range of turbine speeds, means for maintaining selected turbine temperatures by control of the variable area discharge nozzle in the cruising range of turbine speeds, and power level selection means interconnecting said fuel control means and said acceleration and cruising range nozzle control means including means for simultaneously selecting an open position of the discharge nozzle and required speeds for power levels corresponding to speeds in the acceleration range and for selecting correlated values of temperature and speed in the cruising range.

7. A control system for an aircraft gas turbine reaction power plant having a variable area discharge nozzle comprising means for maintaining selected turbine speeds by control of fuel input, a discharge nozzle adjusting motor, means connected to said motor for maintaining the discharge nozzle in an open position for the acceleration range of turbine speeds, means connected to said motor for maintaining selected turbine temperatures by control of the variable area discharge nozzle in the cruising range of turbine speeds, power level selection means interconnecting said fuel control means and said acceleration and cruising range nozzle control means including means for simultaneously selecting an open position of the discharge nozzle and required speeds for power levels corresponding to speeds in the acceleration range and for selecting correlated values of temperature and speed in the cruising range, and means connected to said fuel control means responsive to an acceleration condition thereof for partially disabling said motor to prevent closure of the discharge nozzle.

8. A control system for providing the most economical use of fuel to obtain the greatest thermal efficiency under varying conditions of operation of a thermal power plant having a variable discharge area comprising a power plant speed regulator for controlling fuel input to thereby maintain selected speeds, a power plant temperature regulator for limiting the maximum power plant temperature to selected values by control of the variable discharge area thereof, a discharge area regulator for maintaining selected minimum values of discharge area, and apparatus connected to all of said regulators for simultaneously changing the selected values of desired speed and temperature and minimum discharge area according to predetermined correlated schedules upon a change in power output required of said power plant.

9. A control system for an aircraft gas turbine reaction power plant having a variable area discharge nozzle comprising a speed regulator for maintaining selected values of turbine speed by control of fuel, a nozzle area regulator for maintaining the variable area discharge nozzle in an open position for turbine speeds in the acceleration range, a turbine temperature regulator for maintaining variable selected maximum engine temperatures for engine speeds in the cruising range by control of the variable area discharge nozzle, and a power level setting device connected to all of said regulators for simultaneously selecting correlated values of turbine speed and nozzle area and temperature to be maintained thereby according to predetermined desired schedules.

10. A control system for a combustion gas turbine reaction power plant having a variable area discharge nozzle comprising a turbine speed regulator connected to maintain selected speeds by control of fuel flow to the power plant, a nozzle adjusting motor, opening and closing energization circuits connected to said motor for operation thereof respectively in the nozzle opening and closing direction, minimum nozzle area and maximum temperature regulators connected to control said opening and closing circuits to respectively maintain selected minimum nozzle areas and selected maximum engine temperatures by control of the nozzle area, said nozzle area and temperature regulator connections in said nozzle opening circuit being respectively in parallel for independent actuation thereof by either regulator, said nozzle area and temperature regulator connections in said closing circuit being arranged in series for dependent actuation thereof by concurrent operation of both of said regulators, an acceleration signal responsive device connected to said speed regulator for the detection of an acceleration condition and connected in series in said closing circuit for disconnection thereof during said condition, a power level selection device connected to said speed and nozzle and temperature regulators and arranged to simultaneously select correlated values of speed and minimum nozzle area and maximum temperature to be held by said regulators at the power level selected.

11. A control system for a fuel burning aircraft gas turbine having a variable area discharge nozzle comprising an adjustable power level selection device for simultaneously selecting correlated values of maximum engine temperature and engine speed in both an acceleration range and a cruising range of power output levels, the selected values of temperature in the acceleration range being less than the minimum attainable, a temperature regulator connected to said device including a nozzle adjusting motor for opening the discharge nozzle upon the occurrence of temperatures higher than those selected by said device, and a speed regulator connected to said device including engine fuel flow control apparatus for maintaining speeds selected by said device by control of engine fuel flow.

12. A control system for an aircraft gas turbine reaction power plant having a variable area discharge nozzle comprising a fuel system for supplying fuel to the power plant including a valve for controlling the rate at which the fuel is supplied, a regulator connected to control said valve including a connection for detection of turbine speed for the regulation of selected speeds by control of fuel; a positioning motor for varying the power plant discharge nozzle area, a temperature regulator connected for energizing said motor for changing the position thereof including devices for detecting power plant temperature for maintenance of a selected temperature by variation of the discharge area, a discharge nozzle regulator for controlling the discharge nozzle in the turbine speed acceleration range; and a power level selection device connected to said nozzle regulator and to both said speed and temperature regulators for concurrently selecting correlated values of constantly increasing maximum temperature and speed upon the selection of increasing output levels in the cruising power range.

13. A control system for a fuel burning aircraft gas turbine having a variable area discharge nozzle and comprising an adjustable power output level setting apparatus for concurrently selecting increasing values of maximum temperature and decreasing values of speed for compensation of increases in thermal stresses by decreases in mechanical stresses as higher power levels are set, a fuel regulator including turbine speed measuring apparatus connected to said power setting apparatus for maintenance of the speed selected thereby, a temperature regulator connected to said power setting apparatus including devices for measuring turbine temperature and arranged to compare the measured temperature with the selected temperature to obtain a temperature change signal, and a motor connected for energization by said temperature regulator for positioning the variable area discharge nozzle.

14. A control system for an aircraft gas turbine reaction power plant having a variable area discharge nozzle comprising a fuel system for supplying fuel to the power plant including a valve for controlling the rate at which the fuel is supplied, a regulator connected to control said valve including a connection for detection of turbine speed for the regulation of selected speeds by control of fuel; a positioning motor for varying the power plant discharge nozzle area, a temperature regulator connected for energizing said motor for changing the position thereof including devices for detecting power plant temperature for maintenance of a selected temperature by variation of the discharge area; and a power level selection device connected to both said speed and temperature regulators for concurrently selecting correlated values of constantly increasing maximum temperature and constantly decreasing speed upon the selection of increasing output levels in the cruising power range.

15. A control system for a combustion gas turbine reaction power plant having a variable discharge nozzle area comprising a turbine speed regulator connected to control combustion fuel to maintain selected speeds, a temperature regulator including a variable discharge nozzle positioning motor for maintaining selected values of maximum temperature by adjustment of the nozzle, a power level selection device connected to said regulators for selecting the values of speed and maximum temperature to be maintained thereby in accordance with the desired power output level, the temperatures selected by said device in the acceleration power range being below the minimum attainable with maximum discharge area and both the temperatures and speeds selected in the cruising power range having values correlated to produce maximum fuel economy.

16. A control system for a combustion gas turbine reaction power plant having a variable discharge nozzle area comprising a turbine speed regulator connected to control combustion fuel to maintain selected speeds, a temperature regulator including a variable discharge nozzle positioning motor for maintaining selected values of maximum temperature by adjustment of the nozzle, a power level selection device connected to said regulators for selecting the values of speed and maximum temperature to be maintained thereby in accordance with the desired power output level, the temperatures selected by said device in the acceleration power range being below the minimum attainable with maximum discharge area and the temperatures selected in the cruising power range having constantly increasing values as higher power levels are selected, and the speeds selected by said device having constantly increasing values in both the acceleration range and the cruising range as higher power levels are selected.

17. A control system for a combustion gas turbine reaction power plant having a variable discharge nozzle area comprising a turbine speed regulator connected to control combustion fuel to maintain selected speeds, a temperature regulator including a variable discharge nozzle positioning motor for maintaining selected values of maximum temperature by adjustment of the nozzle, a power level selection device connected to said regulators for selecting the values of speed and maximum temperature to be maintained thereby in accordance with the desired power output level, the temperatures selected by said device in the acceleration power range being below the minimum attainable with maximum discharge area and the temperatures selected in the cruising power range having constantly increasing values as higher power levels are selected, and the speeds selected by said device having constantly increasing values in the acceleration range and constantly decreasing values in the cruising range as higher power levels are selected.

18. A control system for an aircraft gas turbine reaction power plant having a variable area discharge nozzle comprising a fuel system for supplying fuel to the power plant including a valve for controlling the rate at which the fuel is supplied, a regulator connected to control said valve including a connection for detection of turbine speed for the regulation of selected speeds by control of fuel; a positioning motor for varying the power plant discharge nozzle area, a temperature regulator connected for energizing said motor for changing the position thereof including devices for detecting power plant temperature for maintenance of a selected temperature by variation of the discharge area; a power level selection device connected to both said speed and temperature regulators for concurrently selecting correlated values of speed and temperature to be maintained thereby in accordance with desired power output, the values of temperature selected by said device in the acceleration power range output being below the minimum temperatures attained with maximum discharge area; and a device connected between said speed regulator and said positioning motor actuable in response to an acceleration condition of said speed regulator indicating a required speed higher than the speed achieved for disconnecting said positioning motor to prevent discharge area reducing energization thereof.

References Cited in the file of this patent

UNITED STATES PATENTS 2,734,340    Wood _____ Feb. 14, 1956